Figure 1:
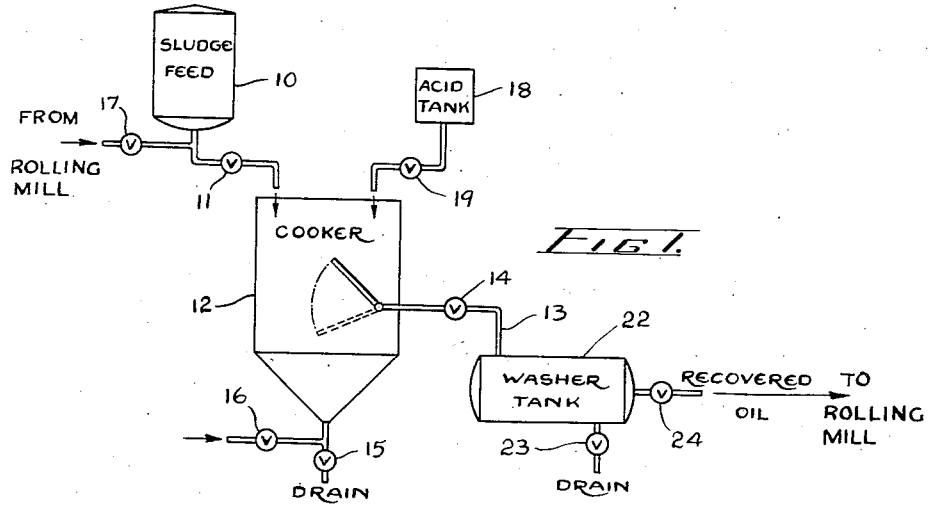

Sept. 17, 1957　　　　　L. KOVACS　　　　　2,806,868

PROCESS FOR RECOVERING ROLLING OIL

Filed Dec. 14, 1954

INVENTOR
LOUIS KOVACS
BY
Maybee & Legris
ATTORNEYS

United States Patent Office 2,806,868
Patented Sept. 17, 1957

2,806,868

PROCESS FOR RECOVERING ROLLING OIL

Louis Kovacs, Mimico, Ontario, Canada

Application December 14, 1954, Serial No. 475,159

6 Claims. (Cl. 260—412.5)

This application is a continuation-in-part of my United States Patent application Serial No. 156,526, filed April 18, 1950.

This invention relates to a process of handling and treating rolling oils, particularly fatty rolling oils such as palm oil, contained in the cooling liquid as supernatant and sedimentary sludges normally discarded in the process of cold rolling of steel strip, with a view to separation of the oils for re-use in the rolling process.

In the process of cold rolling of steel strip to light gauges, palm oil is employed as an aid in rolling. Other natural oils, animal fats and artificially compounded oil mixtures are also employed, especially in the rolling of heavier gauges. Some mills use the oils straight and apply it with air sprays, others spray a mixture or emulsion of water and oil. Some mills use recirculating systems where a large quantity of the oil-water emulsion is flooding the work, in others a smaller quantity of oil is applied on the strip or on the rolls to be used only once and then discarded.

According to conventional practice, the effluent cooling liquid in the rolling process, containing spent rolling oil, is allowed to settle in sumps, pits or settling tanks. A black colored semi-solid supernatant sludge layer is skimmed off, heated in settling tanks, allowed to stand for periods ranging up to several months to remove water, dried by evaporating the remaining water, and sold as a by-product known, if it originated from pure palm oil, as "refuse palm oil." From the bottom of settling sumps or tanks a heavy sedimentary solid layer containing considerable quantities of oil is cleaned out periodically and discarded as waste. If the "refuse oil" is of mixed origin (other fatty oils and mineral oils being mixed with the palm oil) it is burned as fuel or dumped as waste. The "refuse palm oils" of pure palm oil origin available to the trade may be discarded material from the "hot dip tinning" process of the steel industry. This is a high temperature process in which a layer of hot palm oil covers the molten tin to protect it from the atmosphere. From this process "refuse palm oil" is regularly discarded and occasionally with it is mixed dry refuse oil from the cold mills if it is also of pure palm oil origin.

This refuse palm oil is made into a product known as distilled palm oil fatty acids by fatty acid producers. By elaborate processing it could be made into re-usable rolling oils. But this invention is not concerned with the re-making into rolling oils or other products, of refuse palm oils or other waste oils discarded from the steel industry. Rather, it is concerned with the treatment of fresh rolling oils contained in the effluent cooling water after use in the rolling mills; it is concerned with separating fresh rolling oil after being employed in the cold rolling of steel strip from the cooling water and the treatment of it to make possible its re-use and it is mainly concerned with preventing the deterioration of the rolling oils into waste products.

If the effluent cooling liquid is allowed to settle immediately after leaving the mill, supernatant and sedimentary sludges are formed at once. These sludges typically are hygroscopic oil emulsions which may retain as much as 20%–80% water. The sludge freshly collected from the top of the water may contain up to 11% free metallic iron (based on the oil content of the sludge), deriving from the fine abraded particles of the steel strip passing the mill. Bottom sludge freshly collected may contain up to 25% free metallic iron (based on the oil content) and an admixture of general shop dirt. The oil-water emulsion in the sludge holds the oil coated fine metallic iron and some organic ferric iron compounds in a colloidal dispersion.

The novel techniques for handling the top and bottom sludges separated from the cooling water, with which this invention is concerned, are based on the discovery that the sludges age rapidly and undergo radical chemical changes on storage or heating and that the conventional heating of the sludges accelerates the ageing and rapidly turn the rolling oils into "waste" oils.

The rolling oil and the fine abraded iron particles are intimately mixed by the working of the rolling mill to a fine physical mixture. The oil leaving the mill dispersed in the effluent cooling water in the form of sludge is yet substantially unchanged re-usable oil, but the sludges formed and separated from the cooling water are so highly reactant and unstable that on standing the oil is rapidly deteriorated; the iron splits the glycerides and combines with the fatty acids, and the organic iron compounds formed increase in quantity and complexity. The more the sludges age in storage the less readily they respond to the treatments of the invention, for once the oil is chemically deteriorated by ageing to any substantial extent, complex refining techniques are required to make the oil re-usable and the discovery that this process of ageing is a highly critical factor is the basis of the invention.

To prevent chemical deterioration of the oils through ageing the process according to the invention requires the prompt collection of the sludges, either continuously or periodicaly at short intervals, and preferably within from a few minutes to at the most a few hours after use. To collect the top and bottom sludges conventional means and techniques are employed but the invention must be applied only to freshly collected sludges before substantial chemical deterioration has taken place.

In the freshly collected sludges the water-oil-iron mixture defies easy or quick mechanical separation by conventional handling but the new methods of this invention effectively break the emulsion and quickly separate the reactive contaminants from further contact with the rolling oil.

According to the invention the basic treatment comprises the steps of boiling the freshly collected sludge with a suitable dilute acid and injecting live steam into the mass to heat and agitate the sludge simultaneously until what may be called the critical "green" stage is reached, at which stage a water-and-oil-insoluble green-black, somewhat slimy, precipitate is formed. If fresh wet sludges are used this precipitate includes the dark colored contaminants and if the fresh emulsion is completely broken this precipitate settles as a dark colored layer between the aqueous bottom layer and the supernatant clear oil layer. After settling the clear oil layer is removed and may be washed with water to remove traces of mineral acid and produce a re-usable oil without further treatment.

The foregoing basic treatment is called the "wet" treatment and it derives from the novel discovery that hydrogen gas generated in sufficiently fresh sludges at boiling temperature and in the presence of mineral acid and metallic iron will reduce the oil soluble or colloidal organic ferric compounds to readily separable oil insoluble ferrous forms, if sufficient acid is used, and that the emulsion will be broken at the same time. It is also based on the further novel discovery that the free and active metallic iron content of the sludge can be manipulated to utilize it for generating the necessary hydrogen, by interacting with the sulphuric acid or other mineral acids such as hydrochloric acid, or mixtures of hydrochloric and sulphuric acids.

Sufficient free iron is available in all freshly collected sludges to generate hydrogen for a sufficient length of time with a suitable quantity of acid to bring about the ferrous "green" stage characteristic of the end of the reaction. If at the same time the emulsion is not yet broken the further boiling with sufficient acid will quickly accomplish it. The main part of the acid consumed serves as the source of all the necessary hydrogen when it combines with the free metallic iron. Normally, when sulphuric acid is used, at the end of the reaction small quantities of both free acid and free metallic iron are present in the aqueous phase because the hydrogen generating reaction will cease in the weak acid concentration before it is fully complete.

A modified treatment according to the invention, conveniently called the "dry" treatment comprises heating the fresh sludges with a suitable acid in an evaporator equipped for mixing at atmospheric or reduced pressure to evaporate all or part of the water and to filter the slurry with conventional filter aids and methods.

Another modified treatment, called the "solvent" treatment is similar to the dry method but employs in addition to the acid treatment the conventional tools and techniques of the solvent extraction and recovery.

The dry and solvent treatments of this invention are based on the discovery that reduction by hydrogen to readily separable oil insoluble organic ferrous compounds such as that effected by reacting dilute sulphuric acid with the free iron contained in the fresh or inhibited sludges, will also proceed with good results in sludges dissolved in solvents or being dried in evaporators. The water and oil insoluble precipitates and gel-like or slime-like settlings of the wet treatment have their counterparts in the dry and solvent treatments as sharp oil insoluble precipitates on the loss of water. The precipitates are intermixed with a large quantity of dry iron sulphate crystals and are removable by conventional filter aids and techniques.

Since the sulphuric acid and metallic iron reaction of this invention results in the separation of re-usable rolling oil only when applied to freshly collected sludges from the process of cold rolling steel strip, these treatments are preferably employed to provide a regenerating cycle at the location of the rolling operation and as a part of the operating equipment of a rolling mill. However, where a delay, such as may be required for transport, must occur between the collection of the sludges and the separation treatment according to the invention, the invention includes a pre-treatment which can be performed immediately on the location of the mill, to preserve the oil in the fresh sludge until it can be separated by the further application of the invention.

The preferred pre-treatment comprises adding sufficient mineral acid, such as sulphuric or hydrochloric acid, to the fresh wet sludge, forming with the water in the sludge a suitable quantity of dilute acid, and heating the mixture to promote the generation of hydrogen in the sludge by the reaction of the dilute acid with free iron in the sludge. It is thought that organic ferric iron compounds are at least partially reduced by the nascent hydrogen to the corresponding ferrous compounds. For this partial treatment, approximately 1 to 2% of acid, based on the gross weight of the sludge, is beneficial and it is preferably added in two stages. About 1% of sulphuric acid or its equivalent is added to the wet sludge, the sludge is heated to boiling, settled for a short period, and the aqueous layer is removed, another 1% of sulphuric acid or its equivalent is mixed with the sludge, and the sludge is pumped to suitable containers for transport or storage. This treatment will inhibit the ageing of the sludge for two to three weeks, even if it is carried out crudely on location without much control, and the removal of the aqueous layer partially de-waters the sludge, making it more suitable for transport to another location for final separation of the oil. The product of this preferred pre-treatment is what is called herein as "inhibited" sludge. The wet, dry, and solvent treatments may be applied to the inhibited sludges produced by the foregoing pretreatment as well as to fresh sludges to separate re-usable rolling oil.

In the accompanying drawings,

Fig. 1 diagrammatically illustrates the conventional type of apparatus in which the "wet" treatment according to the invention may be carried out.

Figure 2:
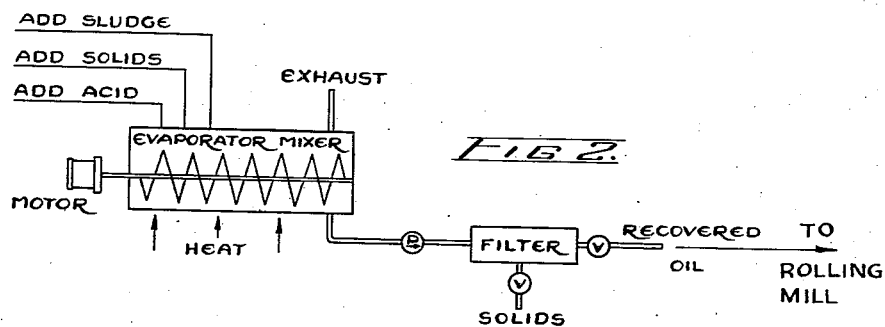
Figure 3:
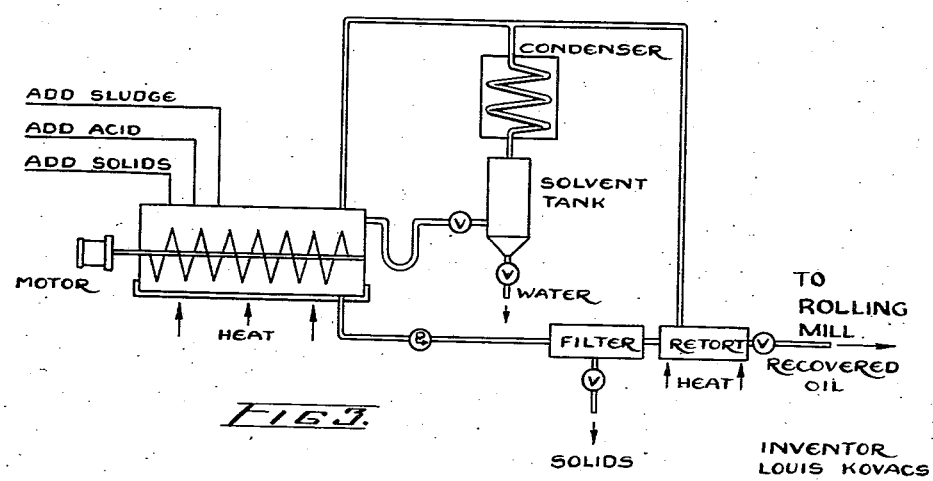

Fig. 2 is a flow sheet diagrammatically illustrating the "dry" treatment of the invention; and Fig. 3 is a flow sheet diagrammatically illustrating the "solvent" treatment of this invention.

A simple form of apparatus for the "wet" treatment of this invention, as illustrated in Fig. 1, comprises a feed tank 10 of suitable size which empties through a valve 11 into an open cooker 12. The cooker has a "swing pipe" 13 having an outlet valve 14 and serving to enable the top layer of oil to be decanted by adjusting the height of the pipe inlet. (A flexible joint provides for the up and down swing of this conventional device.) A valve 15 with suitable piping is provided to drain the tank and an inlet valve 16 is used to admit either live steam, compressed air or cold water as needed. A similar valve 17 on the feed tank 10 allows live steam and compressed air to be admitted to this tank also. Above the level of the cooker 12 there is an acid measuring tank 18 having a control valve 19 by which sulphuric acid may be added to the cooker 12 in a regulated flow. The cooker 12 discharges through the drain valve 14 to a wash tank 22, which has a drain valve 23 and an outlet valve 24.

The procedure for a typical run using the apparatus described is begun by collecting the fresh sludge from the effluent cooling liquid from the rolling process. The separated sludge typically contains about two-thirds water and one-third oil. Based on the weight of oil in the sludge, the content of free metallic iron is typically about 10% and may range from about 6% to about 25%. The particular constitution of the batch, and the optimum conditions for treatment, will be determined by preliminary laboratory tests such as will be described.

The freshly collected sludge is run into the feed tank 10 and heated rapidly to about 160° F. by injecting live steam, and the hot sludge is immediately fed into the cooker 12. Simultaneously 66° Bé. sulphuric acid is run into the cooker from the acid tank 18 to provide with the water in the sludge dilute acid which will react with the free metallic iron content of the sludge. A typical charge will contain about 10,000 lbs. of oil in a gross weight of 30,000 lbs. of sludge, and such a charge may require, as a typical example, about 2000 lbs. of acid, which will be fed to the cooker from the acid tank 18. While the cooker is being charged and for about 30 minutes thereafter the batch is agitated and heated by injecting live steam and some compressed air through the valve 16. The batch is then allowed to settle for a period of from 2 to 12 hours. For the first 1 to 3 hours hydrogen bubbles may continue to rise through the mixture.

After settling, the supernatant oil layer is decanted off.

through the pipe 13 to the wash tank 22, and washed several times with hot water. After a final period of settling, the supernatant oil, substantially free of water and mineral acid, is run off for re-use in the rolling process.

In some cases, a "second boil" may be beneficial in order to increase precision by carrying out the process in two stages. This involves draining the water layer from the cooker 12 after the settling period, adding an amount of water equal to one-third of the oil left in the cooker, adding 1%–5% sulphuric acid based on the weight of the oil (in this typical case 1% of 10,000 lbs. or 100 lbs.), agitating and heating the batch at boiling temperature for about 15 minutes, and then settling and decanting off the oil as described above. The yield of oil will be close to 100% of the oil actually present in the sludge, and the typical batch described will therefore produce nearly 10,000 lbs. of oil.

This typical run will proceed with good success on all the normal fresh sludges which normally contain over 6% free metallic iron. Difficulties may arise with "inhibited" sludges (where part of the metallic iron was converted into the sulphate by the acid pre-treatment) if the free metallic iron gets below 3% (based on the oil content). Fresh sludges high in free iron may have to be added to restore the necessary free metallic iron content. In all cases not substantially less than 3% of free metallic iron based on the weight of oil in the sludge must be present and reacted with the acid in order to separate re-usable oil. On the basis of chemical equivalence, this means more than 5% of 66° Bé. sulphuric acid (based on the oil content) has to be used in treating even the least contaminated fresh sludge.

Generally in the "wet" treatment of normal fresh sludge the acid consumed is practically the chemical equivalent of the available free metallic iron content. There are, however, many practical variables typical of a certain mill practice or a certain kind of oil which influence the amount of acid needed independently from the iron content. The sludges from a typical 42 inch mill where only palm oil and water are employed, containing for example 9% of free metallic iron (based on the oil content) and 65% water to 30% oil, will normally require about 18 to 20% sulfuric acid (also based on the weight of oil) in order to break the emulsion and produce a maximum yield of high quality oil. But up to 30% of acid will be required in extreme cases on sludge containing only 7% of iron (based on the oil content) but originating from a typical mill-wash type of rolling operation where a detergent solution is sprayed on the back-up rolls of the mill and froms a stubborn emulsion in the sludge. The water content of the fresh sludge will greatly influence the amount of acid needed. Usually more than 7% concentration of acid (based on weight of water) is desirable for vigorous generation of hydrogen. On sludges of high water content 20% acid (based on weight of oil) is normal requirement for breaking the emulsion.

To account within practical limits for the amount of acid needed to treat fresh sludges to separate re-usable oil a survey was made of applicants' records which include 118 specific cases from 12 cold rolling mills in the United States, Canada, Wales, Frances and include 7 types of rolling oils (all the principal types known to the applicant).

The tests were conducted on fresh "wet" sludges to determine the amount of acid required:

To reach full "green" stage;
To produce constant (highest) yield;
To achieve constant (best) color.

These tests generally comprise boiling representative samples of sludges with gradually increasing quantities of dilute sulphuric acid and usually involve three separate parallel tests with calculations of the time and acid required to reach constant values.

These laboratory tests are tabulated below and expressed as a maximum and minimum percentage of 66° Bé. sulphuric acid based on the oil content of a sludge:

| Basis—Oil and 66° Bé. H₂SO₄ (nearest whole number) | Number of specimens tested | Percent range | |
|---|---|---|---|
| | | Max. | Min. |
| Percent acid for full green stage | 110 | 18 | 8 |
| Percent acid for highest constant yield | 92 | 27 | 13 |
| Percent acid for best constant color | 38 | 21 | 10 |
| Percent free metallic iron | 19 | 25 | 4 |
| Other variables based on gross weight of the sludge: | | | |
| Percent water content | 118 | 83 | 17 |
| Percent oil content | 118 | 75 | 15 |

This survey indicates that the limits of sulphuric acid percentages based on the oil content of fresh sludges are 8% minimum and 27% maximum in the laboratory. It also demonstrates that normal fresh "wet" sludge cannot be successfully treated by this invention with less than 8% sulphuric acid or its equivalent (based on oil content), the practical range being between 15%–19%.

In all cases quantitative and qualitative preliminary tests can be used to determine the amount of acid which must be reacted with iron to continue the generation of hydrogen for a sufficiently long period to produce the green-black precipitate which marks the critical "green" state of the reaction, and a suitable experimentally determined or arbitrary excess over this amount will be used in order to produce the best yield and quality of oil.

The critical nature of the factor of ageing before treatment of the sludge is illustrated by the series of tests described below. The tests were carried out on a sample of palm oil sludge collected from a large rolling mill 30 minutes after the oil had been used in the rolling of steel. The sample was divided into five parts which were numbered from 1 to 5. Each part was tested by subjecting it to the manipulative steps of the typical run described in column 4, line 48 to column 5, line 32 of this specification. Part number 1 was tested immediately and parts 2–5 were each tested successively at intervals of twenty-four hours. Another sample of sludge containing the same kind of oil and collected from the same mill two months earlier was identified as number 6 and tested in the same manner. The percentage of sulphuric acid employed for treating each part was 25% which amount was determined by preliminary laboratory tests to be slightly in excess of that required for the best yield and quality, and the refined product was tested for the percentage of free fatty acids (F. F. A.) and for its water content. The color of the product was also observed. All the sludges which were stored except number 6 were stored in the wet condition at 130° F. Number 6, after storage for several days at 130° F., was dried at 220° F., and settled out to convert it into the product commercially known as "refuse palm oil." It was then stored dry for the remainder of the two months.

The results of the said tests are set out in the following tables.

| No. | Sludge | | Separated oil | |
|---|---|---|---|---|
| | Age | Water content | Free fatty acid content | Color |
| 1 | 30 minutes | 70 | 14.1 | Light orange. |
| 2 | 24 hours | 50 | 29 | Light tan. |
| 3 | 2 days | 25 | 34 | Dark tan. |
| 4 | 3 days | 16 | 36 | Darker than No. 3. |
| 5 | 4 days | 13 | 37 | Darker than No. 4. |
| 6 | 2 months | 0 | 69 | Brown black. |

The above table shows a drastic rise in the free fatty acid content of the oil and a noticeable darkening in color if the sludges are aged for even 24 hours. Rolling oil containing more than 20% of free fatty acids is not acceptable for re-use in many cold rolling mills, and therefore ageing for 24 hours deteriorated the oil excessively. Ageing of the sludge for periods greater than 24 hours produced a steady decrease in the quality of the oil, and it is apparent that the even more drastic ageing by combined heating and drying to which the material known as "refuse palm oil" is subjected converted the sludges into an entirely different product to which the process according to the invention has no application.

A further test to illustrate the ageing was carried out on a fresh wet sludge collected from a 42″ cold reducing mill effluent water where the original oil applied was "modified tallow" (a No. 1 beef tallow, deodorized). Preliminary tests indicated 9% free metallic iron and an acid requirement of 20% based on oil.

The sample collected was divided into five parts and each part was treated at 24-hour intervals—as shown in table.

| No. | Sludge | | Separated oil | |
| --- | --- | --- | --- | --- |
| | Age | Water | F. F. A. | Color |
| 1 | 36 minutes | 64 | 8.3 | Yellow. |
| 2 | 24 hours | 48 | 14.1 | Light Tan. |
| 3 | 48 hours | 28 | 21.6 | Tan. |
| 4 | 3 days | 19 | 32.4 | Dark Tan. |
| 5 | 4 days | 15 | 39.1 | Brown. |

This oil, relatively more stable, shows the same curve of deterioration, but to reach the same stage takes longer. The oil in 3 (48 hours old) was the lowest quality the mill was able to re-use.

The following examples are illustrative of the process.

EXAMPLE I

The original rolling oil in the sludges of this example was a mixture of 30% palm oil and 70% tallow, and it had been applied on a continuous 42-inch tandem five-stand cold reducing mill by spraying it on the steel strip. 30,000 lbs. of fresh wet sludge was separated from the spent cooling water flowing from the mill, within 20 minutes after use, and heated to 160° F. in the tank 10 by introducing steam and compressed air. Preliminary laboratory tests were made, and indicated a water content of 67% (10,000 lbs. of oil) and a metallic iron content of 980 lbs. The tests indicated that the highest yield and the best product would be produced by treatment with 24% of 66° Bé. sulphuric acid (based on the oil content) and by a well agitated short, hard boil to which the acid should be added considerably faster than it was consumed, particularly toward the green stage of the reaction.

The hot sludge was run into the cooker 12 with 2400 lbs. of 66° Bé. sulphuric acid. The batch was agitated and heated to boiling with steam and air for 30 minutes. At the end of this period a green-black precipitate gave the batch a green appearance. The batch was settled for 8 hours, and the oil layer decanted off and washed in the tank 22, after which the recovered oil was fed back to the oil storage tanks in the steel mill. The yield was 9,700 lbs. (97%).

EXAMPLE II

The results of the treatment of a wet, fresh sludge which has a relatively high content of total iron but a low content of free metallic iron which is representative of a mixture of fresh sludges and "inhibited" sludges previously referred to, are set forth in Table I. (The "inhibited" sludges normally have a lower metallic iron and water content than the typical fresh sludges, as previously explained, but they are otherwise similar to fresh sludges.) The original rolling oil in this example was palm oil, 40 parts fresh sludge, 60 parts "inhibited" sludge. Preliminary laboratory trials on the sludge indicated that treatment of the sludge with approximately 8.0% of concentrated sulphuric acid, based on the oil content of the sludge, and boiling for 17 minutes would yield a satisfactory product. This amount of acid would react with an amount of free metallic iron equal to about 4.2% of the oil (fatty matter) content of the sludge.

Table I

| | Raw material | Product |
| --- | --- | --- |
| Color | Grey black to bluish. | Orange. |
| Water | 54% | Less than 0.1%. |
| Metallic iron (free and as the sulphate) | 7% | Nil. |
| Other solids | 1% | Nil. |
| Total fatty matter (by xylol extract) | 37% | 100%. |
| Oil soluble or colloidal iron | 0.3% | Less than 0.01%. |
| Free fatty acids (in the xylol extract) | 12% | 17%. |
| Saponification number | | 178. |

The "wet" treatment which was employed for refining the sludge to which Table I relates was as follows: A kettle similar to cooker 12 (see Fig. 1) was charged with 10,000 lbs. of the sludge and the acid measuring tank was charged with 300 lbs. of 66° Bé. sulphuric acid. Steam was admitted through a suitable valve while the acid was allowed to run into the sludge, the valve on the acid tank being set to empty that tank in approximately 15 minutes. The exact setting of the acid and steam valves was easily determined by experience so as to cause boiling to proceed vigorously without boiling over. The reaction was started at what may be called the "black" stage; the stages of the reaction were identified by the color of progressive samples taken from the reaction mixture. A thin layer on a glass disk when held against a light could be described as "black and heavy," "brown and dirty" and "brown green," "black green" and "broken green" progressively. In about 5 minutes the reaction reached the "brown" stage and in about 15 minutes the final "green" stage when the steam and acid were shut off. The time of the reaction was kept as short as possible to avoid splitting of the glycerides and an undesirable increase in the free fatty acid content of the re-usable oil.

After the steam was turned off a turbid oil layer separated on the top. The oil layer was broken by hydrogen bubbles mixed with steam forming by a continuing reaction between the metallic iron in the sludge and the acid. This disturbed the settling of the very fine green-black precipitate which was now clearly visible in oil samples taken on glass. After settling for 2 hours the bottom aqueous layer was drained to waste through valve 13 and about 2,000 lbs. of cold water was introduced through valve 14 without disturbing or mixing with the top layer. The formation of hydrogen ceased in about 10 minutes and the batch was settled overnight. On the next day the operator syphoned off the clear supernatant oil layer by setting the swing pipe to the proper height, and the water and oily mud was drained to a sump tank. The yield was 3500 lbs. of re-usable oil having the characteristics set out in Table I and was returned to the mill for re-use.

The procedure of the wet treatment, as illustrated in Example I and Example II, may be modified by carrying out the reaction in two stages, stopping when part of the acid is consumed, allowing the mixture to settle for a short period, removing the sediments and treating the "brown" stage oil with cold water; the mixture is then boiled vigorously with steam, the remainder of the acid is added and the mixture allowed to settle as before by adding water and leaving it overnight. The variations in the raw material and in the equipment available may modify the minor details of the procedure considerably but simple preliminary trials will indicate to anyone skilled in the art the optimum or practicable amounts of metallic iron and acid and the time of reaction.

EXAMPLE III

The original oil was "sperm oil" and had been applied on a 56-inch tandem four-stand cold rolling mill by spraying it on the strip. The freshly collected sludge had been inhibited within 10 minutes after use by pre-treatment with 7% of acid (based on the oil content) in a normal two stage inhibiting treatment as previously described.

The inhibited sludge had an iron content of 5% as free iron and sulphate and a water content of 25%. After storage for one week it was subjected to a representative dry refining treatment. Preliminary laboratory tests indicated that 250 lbs. of concentrated sulphuric acid for a 10,000 lbs. batch with an adjusted water content of 35%, would give a satisfactory product. The procedure was as follows: 10,000 lbs. of the diluted sludge was charged into a steam-heated evaporator (see Fig. 2). 150 lbs. of sulphuric acid was added and the evaporator temperature was rised to 200° F., with agitation. The heat was then turned off, the agitation was stopped and the mixture was settled. The water layer was removed from the bottom, and heating and agitation were continued until the boiling point was reached. 100 lbs. of sulphuric acid was slowly added, the flow being timed to introduce all the acid by the time the water evaporated, which took 20 minutes. A test sample showed a sharp green-black precipitate. The heat was then stopped while the agitation was continued. A suitable quantity, approximately 1.5%, of a conventional type of filter aid known as "cellite" was added, and the mixture was pumped through a filter to a storage tank, yielding approximately 5625 lbs. of refined oil. The acid consumed by the original "inhibition" treatment of 2% gross represents in this case about 7% of the oil content. The additional 250 lbs. of acid consumed in 2 parts represents 4.5% of the oil content, so the total acid used in the 3-stage treatment was 11.5% which would represent the lowest possible acid consumption for this kind of a sludge.

Wide variation in the "dry" treatment is possible on the different fresh sludges, but simple trial tests will indicate the optimum formulation for each type. As in the case of the "wet" treatment, the reaction may be carried out in one stage or in two stages as described in this example. Fuller's earth, active carbon or silica gel as conventional bleaching agents may be useful in color and odor corrections and can be applied separately or in combination. If desired, centrifugal separation or settling can be employed instead of filtering. The amount of acid must be sufficient to cause the reaction to reach the "green" precipitated stage, but in the "dry" treatment it is undesirable for the amount of acid to exceed chemical equivalency with the metallic iron, since an excess of acid will attack the oil in the absence of water.

The "solvent" treatment according to the invention is a variation of the "basic" treatment wherein a fat solvent is employed during the acid treatment. In the application of the "solvent" treatment to the Examples I, II, III, the relative proportions of the acid and sludges remain the same. In addition to the other ingredients such as acid and water, a suitable quantity of a petroleum solvent having a boiling range of 100° C. to 130° C. is also introduced in a suitable extractor (see Fig. 3). After the reactions are complete, the oil solvent phase is separated from the aqueous and solid phases by conventional methods and freed from the solvent to recover the re-usable oil.

EXAMPLE IV

This example illustrates the preferred employment of the invention as a regenerating cycle at the location of a rolling mill as part of a continuous rolling operation.

A typical continuous rolling system which is employed, consists of two parallel 42" wide continuous picklers and two parallel 42", 4-high, 5-stand, 2000-feet-per-minute tandem mills. The cold rolled strip produced is about 0.008" thick. Approximately 1.5 lbs. of re-used palm oil per ton of steel pickled is applied on the pickled strip continuously before cold rolling, and approximately 3.0 lbs. of re-used palm oil per ton of steel and 3.0 lbs. of virgin palm oil per ton of steel is sprayed on the strip continuously as it passes the mill. The mixture is sprayed on both sides of the strip as a 4:1 mixture of water and oil. Approximately 2000 gallons of cooling water per minute is also sprayed on the working rolls and the strip.

All the cooling water and the dispersed oil sludge collects from both mills in one sump and it is continuously pumped to a primary separating plant about 2000 feet distant where the sludges are continuously separated by flotation cells and settlers and the separated sludges accumulated in a receiving tank.

At intervals of 24 hours the collected sludges, approximating 30,000 lbs., are treated with about 2000 lbs. of 66° Bé. sulphuric acid and boiled in cone bottomed lead lined open top cookers, then separated, second boiled, settled, washed in washing tanks and the clear oil is returned to the mills for re-use.

The average age of the sludge when heated is 12 hours and it contained an average of free iron content of 9% before treatment.

The characteristics of the continuously re-used palm oil were averaged on the basis of the following typical month's production figures:

| | |
|---|---|
| Tons of steel rolled _____ tons __ | 60,000 |
| Virgin palm used _____ lbs __ | 200,000 |
| Palm oil re-used _____ lbs __ | 250,000 |
| 66° Bé. sulphuric acid used _____ lbs __ | 54,000 |

The average characteristics were as follows:

| | |
|---|---|
| Water _____ percent __ | 0.1 |
| F. F. A _____ do ____ | 22 |
| S. N _____ | 180.0 |
| Color _____ | Tan |
| Mineral Acid _____ | Nil |
| Sulphate _____ | Nil |

EXAMPLE V

This example illustrates the continuous separation and treatment and re-use of rolling oil on a rolling system consisting of four parallel continuous picklers, two separate rolling mills and one treating plant for rolling oil:

The four pickle lines deliver pickled coils to the two tandem mills, and approximately 1.5 lbs. of re-used oil is applied on the pickled strip per ton of steel.

One 56"-wide, 4-high, 5-stand, 4000-feet-per-minute tandem mill produces light gauge cold rolled strip for tinplating, galvanizing and backplate. Approximately 4.0 lbs. of re-used oil per ton of steel and 3.0 lbs. of virgin palm oil per ton of steel is applied on the work. About 1600 gallons of cooling water per minute is used.

The water and dispersed sludge is pumped to continuous flotation cell separators and the separated sludge is treated according to the invention as in previous examples. The oil is returned for re-use separately on this mill.

The second tandem mill, a 66"-wide, 4-high, 4-stand, 3000-feet-per-minute cold rolling mill, produces intermediate and heavy gauge cold rolled strip and at times it is using the mill-wash technique in which at the finishing stands of the tandem mill a detergent and water solution is sprayed on the backup rolls, working rolls and the strip to remove excess oils from the strip leaving the mill.

On this mill approximately 1.0 lb. of re-used oil per ton of steel is sprayed on the strip and approximately 2.5 lbs. of a virgin oil is applied. This may be a choice of 4 kinds of rolling oils according to the operation, namely tallow, mineral oil, palm oil and sperm oil based compounds. 1500 gallons per minute of cooling water is employed and all effluent is pumped with a sump pump to a settling pond at the treating plant.

With a continuous skimmer the sludges are collected and in 20–30,000 lb. batches are treated as described before. Acid consumption on some batches reaches 30% based on the oil content, including any inhibiting amounts used. The free iron content averages 10%.

The production figures for a typical month are:

| | | |
|---|---|---|
| Steel rolled | tons | 120,000 |
| Virgin oils (4 kinds combined) | lbs | 320,000 |
| Re-used oils (2 kinds combined) | lbs | 420,000 |
| Sulphuric acid used | lbs | 97,000 |

The typical specifications of the two standard blends of re-used oils produced are:

| | Blend A (56" mill oil) Average age of the sludge when treated was 12 hours | Blend B (66" mill oil) Average age of the sludge when treated was 24 hours |
|---|---|---|
| Water | 0.1 | 0.1 |
| F. F. A. | 24.0 | 26.0 |
| S. N. | 180.0 | 156.0 |
| Color | Tan | Dark tan |
| Sulphate | Nil | Nil |
| Min. acid | Nil | Nil |

It is thought that the carrying out of the invention will be apparent from the above description. It is to be understood that the forms of the invention described are to be taken as preferred examples of the same and that various changes in the procedures and applications of the invention may be resorted to, without departing from the scope of the claims. In particular, the unit operations and reactions may be carried out continuously, the acid being added continuously to continuously collected sludges in the proper proportions.

What I claim as my invention is:

1. A process for treating the cooling and lubricating liquid containing a fatty rolling oil emulsion and cooling water used in the process of continuous cold rolling of steel strip, comprising, the steps of collecting from the main body of the liquid sedimentary and supernatant sludge containing the oil emulsified with water and contaminated with impurities, adding a mineral acid in sufficient quantities to react with all the metal present, said acid being selected from the group consisting of HCl and $H_2SO_4$, to the sludge to provide dilute acid in contact with the impurities, the addition of the acid being made within about 48 hours time after use and before substantial chemical deterioration of the oil has occurred, maintaining the reaction mixture at an elevated temperature until the emulsion is broken and a water-and-oil insoluble precipitate is formed, and separating the oil from the mixture ready for re-use in the rolling process.

2. A process for preventing deterioration of substantially unchanged fatty rolling oil contained in the cooling and lubricating liquid used in the operation of continuous cold rolling of steel strip, comprising, collecting from the main body of the liquid, sedimentary and supernatant sludge containing the oil emulsified with water and contaminated with impurities, promptly adding to the fresh wet sludge an amount of a mineral acid selected from the group of $H_2SO_4$ and HCl representing from about 8 to about 27 percent of the weight of the oil to provide acid in contact with the impurities, the addition of the acid being made within about 48 hours after use and before substantial chemical deterioration of the oil has occurred, maintaining the mixture at an elevated temperature until the emulsion is broken and a water-and-oil insoluble precipitate is formed, and separating the oil from the mixture.

3. A process for separating rolling oil as claimed in claim 2, in which the reaction mixture is boiled until the emulsion is broken and the precipitate is formed.

4. A process for preserving and separating rolling oil, for reuse in the process of cold rolling of steel strip, from the effluent cooling and lubricating liquid in the process, comprising collecting from the main body of the liquid sedimentary and supernatant sludge containing the oil emulsified with water and contaminated with impurities including free metallic iron and iron compounds, promptly adding to the fresh wet sludge about 1 to 2 percent of sulphuric acid, based on the gross weight of the sludge to provide in the mixture dilute acid to inhibit chemical deterioration of the oil, the addition of the acid being made within about 48 hours after use and before substantial chemical deterioration of the oil has occurred, subsequently adding a further amount of sulphuric acid such that the total acid added represents from about 8 to 27 percent of the weight of the oil and does not substantially exceed chemical equivalency with the iron content of the sludge, to the mixture and maintaining the mixture containing the subsequently added acid at an elevated temperature until the emulsion is broken and a water-and-oil insoluble precipitate is formed, and separating the oil from the mixture.

5. A process for separating rolling oil, for reuse in the process of cold rolling of steel strip, from the effluent cooling and lubricating liquid in the process, comprising collecting from the main body of the liquid sedimentary and supernatant sludge containing the oil emulsified with water and contaminated with impurities, promptly adding to the fresh wet sludge an amount of mineral acid selected from the group consisting of HCl and $H_2SO_4$ representing from 8 to 27 percent of the weight of oil in the sludge to provide in the mixture dilute mineral acid at an elevated temperature, the addition of the acid being made within about 48 hours after use and before substantial chemical deterioration of the oil and the sludge has occurred, subjecting the mixture at an elevated temperature to extraction with a fat solvent until a water-and-oil insoluble precipitate is produced, and collecting and filtering the solvent layer to separate the oil from the mixture.

6. A process for treating the cooling and lubricating liquid containing a fatty rolling oil emulsion and cooling water used in the process of continuous cold rolling of steel strip, comprising, the steps of collecting from the main body of the liquid sedimentary and supernatant sludge containing the oil emulsified with water and contaminated with impurities, adding to the oil from about 8 to 27 percent by weight thereof of mineral acid selected from the group consisting of HCl and $H_2SO_4$, before substantial chemical deterioration of the oil has occurred, at least about 1 to 2 percent acid based on the gross weight of said sludge being added within about 48 hours after the use of the oil in cold rolling as aforesaid, maintaining the mixture after the addition of all of the acid, at an elevated temperature until the emulsion is broken and a water-and-oil insoluble precipitate is formed, and separating the oil from the mixture ready for reuse in the rolling process.

References Cited in the file of this patent

UNITED STATES PATENTS

| | | |
|---|---|---|
| 322,425 | Cromwell et al. | July 21, 1885 |
| 1,763,430 | Holden et al. | June 10, 1930 |
| 2,316,571 | Dunmire | Apr. 13, 1943 |
| 2,401,340 | Dunmire et al. | June 4, 1946 |
| 2,578,040 | Booth | Dec. 11, 1951 |
| 2,587,954 | Babayan et al. | Mar. 4, 1952 |